(12) United States Patent
Lindquist et al.

(10) Patent No.: US 8,868,704 B2
(45) Date of Patent: Oct. 21, 2014

(54) METHOD, APPARATUS AND COMPUTER PROGRAM PRODUCT FOR STANDBY HANDLING IN A STREAMING MEDIA RECEIVER

(75) Inventors: Jan Erik Lindquist, Älvsjö (SE); Niklas Fondberg, Enskede (SE); Mats Cedervall, Härnösand (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 280 days.

(21) Appl. No.: 13/509,091

(22) PCT Filed: Nov. 16, 2010

(86) PCT No.: PCT/SE2010/051255
§ 371 (c)(1),
(2), (4) Date: May 10, 2012

(87) PCT Pub. No.: WO2011/059396
PCT Pub. Date: May 19, 2011

(65) Prior Publication Data
US 2012/0226756 A1    Sep. 6, 2012

Related U.S. Application Data

(60) Provisional application No. 61/261,578, filed on Nov. 16, 2009.

(51) Int. Cl.
| | | |
|---|---|---|
| G06F 15/16 | (2006.01) | |
| G06F 15/177 | (2006.01) | |
| H04N 21/443 | (2011.01) | |
| G06F 1/32 | (2006.01) | |
| H04L 29/08 | (2006.01) | |
| H04N 21/433 | (2011.01) | |
| H04N 5/782 | (2006.01) | |
| H04N 21/472 | (2011.01) | |
| H04L 29/06 | (2006.01) | |

(52) U.S. Cl.
CPC ..... *H04N 21/47214* (2013.01); *H04N 21/4432* (2013.01); *G06F 1/3203* (2013.01); *H04L 67/025* (2013.01); *H04N 21/4436* (2013.01); *H04N 21/4334* (2013.01); *H04N 5/782* (2013.01); *H04L 65/1006* (2013.01)
USPC ........................................ 709/221; 709/228

(58) Field of Classification Search
USPC .......................................... 709/204, 221, 228
See application file for complete search history.

(56) References Cited

U.S. PATENT DOCUMENTS

| | | |
|---|---|---|
| 5,974,552 A | 10/1999 | Lim et al. |
| 6,052,715 A | 4/2000 | Fukui et al. |

(Continued)

FOREIGN PATENT DOCUMENTS

| | | |
|---|---|---|
| JP | 09-307564 A | 11/1997 |
| JP | 2001-514820 A | 9/2001 |

(Continued)

OTHER PUBLICATIONS

International Search Report, PCT/SE2010/051255, Feb. 8, 2011.

(Continued)

*Primary Examiner* — Ebrahim Golabbakhsh
(74) *Attorney, Agent, or Firm* — Myers Bigel Sibley & Sajovec, P.A.

(57) ABSTRACT

It is presented a method executed in a streaming media receiver, the streaming media receiver comprising native software and web software for executing a web application. The method comprising the steps of: receiving, in an active web application running in the web software, a message indicating that the streaming media receiver is to be put in a passive standby mode; sending, from the active web application, a message to the native software indicating when the active web application is to be reinstated; setting, from the native software, a timer with the time of when the web application is to be reinstated; setting the streaming media receiver in a passive standby mode; receiving, in the native software, a signal that the timer has expired; setting the streaming media receiver in an active standby mode; and sending, from the native software, a message to the web application that the timer has expired.

11 Claims, 7 Drawing Sheets

(56) References Cited

U.S. PATENT DOCUMENTS

| | | | |
|---|---|---|---|
| 2001/0001879 A1 | 5/2001 | Kubik et al. | |
| 2002/0018077 A1 | 2/2002 | Powlette | |
| 2002/0069266 A1 | 6/2002 | Lakhdhir | |
| 2002/0107805 A1 | 8/2002 | Kamimura et al. | |
| 2003/0198184 A1* | 10/2003 | Huang et al. | 370/231 |
| 2003/0236905 A1* | 12/2003 | Choi et al. | 709/231 |
| 2004/0060053 A1 | 3/2004 | Veselov | |
| 2006/0212728 A1 | 9/2006 | Di Benedetto | |
| 2007/0166005 A1* | 7/2007 | Berstis et al. | 386/95 |
| 2008/0288460 A1 | 11/2008 | Poniatowski et al. | |
| 2009/0037596 A1* | 2/2009 | Math et al. | 709/231 |
| 2009/0064252 A1 | 3/2009 | Howarter et al. | |
| 2009/0217336 A1* | 8/2009 | Chang et al. | 725/115 |

FOREIGN PATENT DOCUMENTS

| | | |
|---|---|---|
| JP | 2001-306440 A | 11/2001 |
| JP | 2009-77186 A | 4/2009 |
| WO | WO 98/41001 A1 | 9/1998 |
| WO | WO 2006/016344 A1 | 2/2006 |

OTHER PUBLICATIONS

European Search Report Corresponding to European Patent Application No. 10 83 0289; Dated: Apr. 3, 2013; 11 Pages.

Notice of Reasons for Rejection and English language translation, Japanese Patent Application No. 2012-538794, Jul. 22, 2014.

* cited by examiner

METHOD, APPARATUS AND COMPUTER PROGRAM PRODUCT FOR STANDBY HANDLING IN A STREAMING MEDIA RECEIVER

CROSS REFERENCE TO RELATED APPLICATIONS

This application is a 35 U.S.C. §371 national stage application of PCT International Application No. PCT/SE2010/051255, filed on 16 Nov. 2010, which itself claims priority to U.S. provisional Patent Application No. 61/261,578, filed 16 Nov. 2009, the disclosure and content of both of which are incorporated by reference herein in their entirety. The above-referenced PCT International Application was published in the English language as International Publication No. WO 2011/059396 A1 on 19 May 2011.

TECHNICAL FIELD

The invention relates generally to standby modes, and more particularly to standby modes of streaming media receivers.

BACKGROUND

In the consumer electronics business, significant attention is given to power consumption which has led to guidelines as to how much power is to be consumed. The guiding principal is that less than 1 Watt is to be used while a device is in standby.

These guidelines also apply to streaming media receivers, such as set top boxes for Internet Protocol television (IPTV). In a standby mode at less than 1 W, there is minimum activity that can take place in a streaming media receiver. Such activities can include: monitoring infrared (IR) (to allow the equipment to go into an on mode), monitoring internet protocol (IP) wake-up, and a chip that has wakeup events.

For television sets and set top boxes there are two different types of standby. The one described is often called "passive standby" while there is another called "active standby". The active standby is similar to the state when the equipment is powered on. The difference between active standby and powered on states is that the screen (or display output in the case of the set top box) is inactive.

SUMMARY

An object of the invention is to provide improve flexibility in relation to standby modes of a streaming media receiver.

In a first aspect of the invention, it is presented a method executed in a streaming media receiver, the streaming media receiver comprising native software and web software for executing a web application. The method comprises the steps of: receiving, in an active web application running in the web software, a message indicating that the streaming media receiver is to be put in a passive standby mode; sending, from the active web application, a message comprising data to be saved to an application server; sending, from the active web application, a message to the native software indicating when the active web application is to be reinstated; setting, from the native software, a timer with the time of when the web application is to be reinstated; setting the streaming media receiver in a passive standby mode; receiving, in the native software, a signal that the timer has expired; setting the streaming media receiver in an active standby mode; sending, from the native software, a message to the web application that the timer has expired; and receiving, in the active web application, a message comprising the data that was saved, from the application server.

The provided method provides for a flexible yet secure way for suspending a web application. Moreover, by saving data on the application server before being put into passive standby, the data is not tied to the streaming media receiver that sent the data. In other words, a user could put a first receiver into standby, power on a second receiver, where the second receiver would be started with the web application in the same state as the first receiver. This could for instance be useful if a user moves from one room to the next.

The method may further comprise the step, prior to the step of receiving a message comprising the data that was saved, of: sending a request, from the web application server, to the application server to send the data that was saved.

The step of sending a message to the native software may comprise setting a uniform resource indicator (URI) to be followed upon wakeup.

The step of sending a message to the native software may comprise setting a token with any supplementary information from the active web application. In other words, the token can be a data container comprising the supplementary information, which can be saved by the native application. This can then later be retrieved by the web application upon reinstatement.

The method may be executed in a streaming media receiver in compliance with internet protocol television (IPTV).

A second aspect of the invention is a computer program for a streaming media receiver comprising native software and web software for executing a web application. The computer program comprises computer program code which, when run on the streaming media receiver, causes the streaming media receiver to receive, in an active web application running in the web software, a message indicating that the streaming media receiver is to be put in a passive standby mode; send, from the active web application, a message comprising data to be saved to an application server; send, from the active web application, a message to the native software indicating when the active web application is to be reinstated; set, from the native software, a timer with the time of when the web application is to be reinstated; set the streaming media receiver in a passive standby mode; receive, in the native software, a signal that the timer has expired; set the streaming media receiver in an active standby mode; send, from the native software, a message to the web application that the timer has expired; and receive, in the active web application, a message comprising the data that was saved, from the application server.

A third aspect of the invention is a computer program product comprising a computer program according to the third aspect and a computer readable means on which the computer program is stored.

A fourth aspect of the invention is a streaming media receiver comprising native software; web software for executing a web application; a timer; a mode change detector, in a web application in the web software, arranged to receive a message indicating that the streaming media receiver is to be put in a passive standby mode; a reinstatement module in the web application, arranged to send a message to the native software indicating when the active web application is to be reinstated; a timer setter in the native software, arranged to set the timer with the time of when the web application is to be reinstated; a mode changer arranged to set the streaming media receiver in a passive standby mode after the timer has been set or an active standby mode after the timer has expired; a timer handler in the native software, arranged to receive a signal that the timer has expired and send a message to the web application that the timer has expired; and a data handler in the web application, the data handler being arranged to send a message comprising data to be saved to an application server prior to entering the passive standby mode and to receive a message comprising the data that was saved from the application server after leaving the passive standby mode.

It is to be noted that any feature of the first, second, third and fourth aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
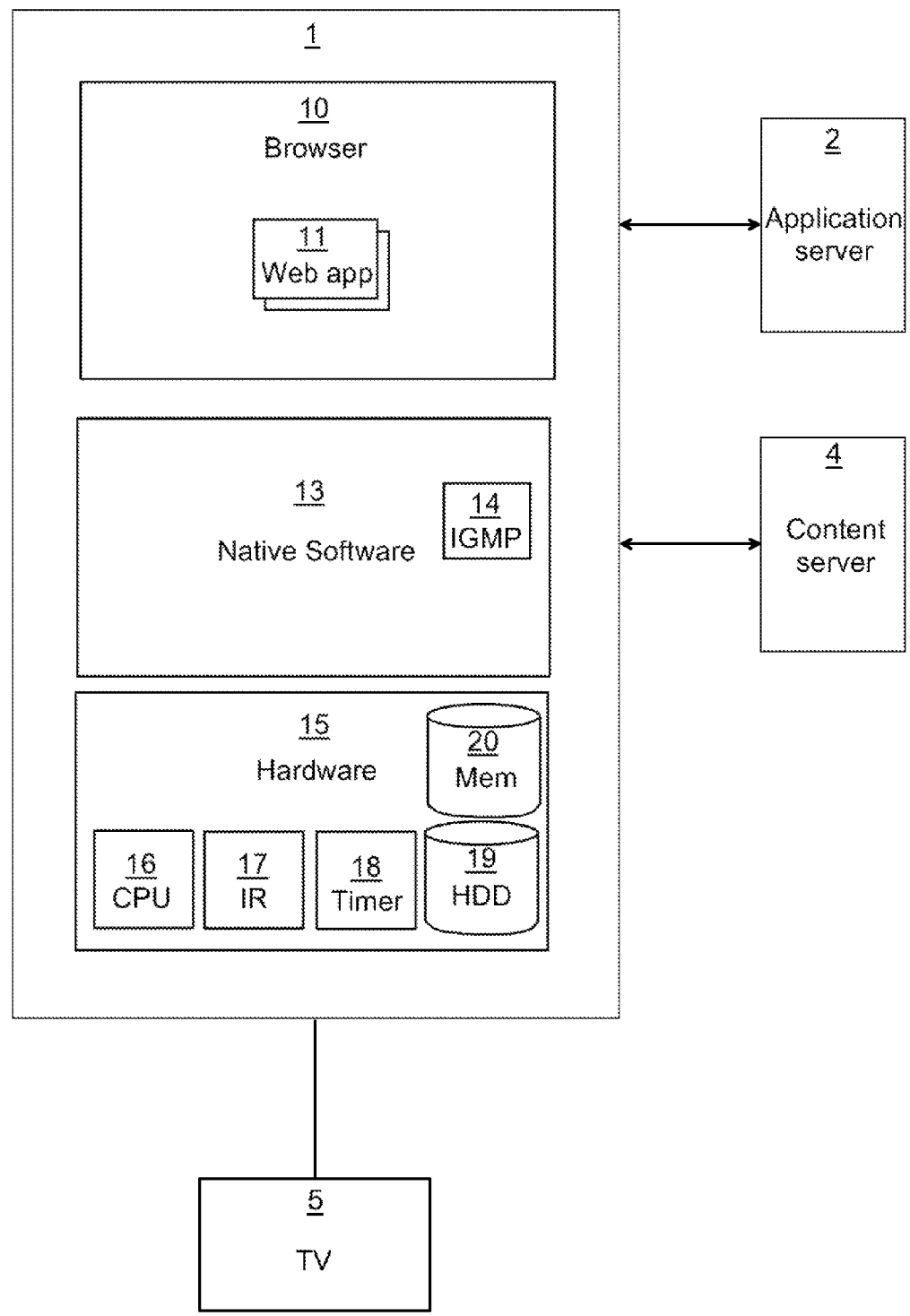
FIG. 1 is a schematic diagram showing an overview of an Internet protocol television (IPTV) environment where an embodiment can be applied.

FIG. 1 is a schematic diagram showing an overview of an Internet protocol television (IPTV) environment where an embodiment of the invention can be applied. A streaming media receiver 1 comprises a browser 10, native software 13 and hardware 15.

The browser 10 can be a web browser supporting dynamic HTML, i.e. supporting HTML and client-side scripting such as JavaScript, a presentation definition language such as CSS and a document object model. Alternatively or additionally, the browser can support other types of content such as Adobe flash, SVG (scalable vector graphics), etc. The browser allows one or more web applications 11 to execute within the streaming media receiver 1, whereby the web applications 11 can interact over an IP (Internet Protocol) network with an application server 2 as is known in the art per se. The streaming media receiver 1 may thus conform to a declarative application environment (DAE) running an open IPTV terminal function (OITF).

The application server 2 is a content server supporting the web applications 11, such as a web server or similar. The application server 2 has ability to dynamically provide content to the browser, using server side code, e.g. using PHP (Hypertext Preprocessor), Java Platform Enterprise Edition, Microsoft .NET Framework, etc. The application server comprises one or more CPUs (central processing units), persistent storage, such as hard drives and internal memory, such as RAM (not shown).

A content server 4 here collectively represents a server for IGMP (Internet Group Management Protocol) commands and effects the actual media streaming to the streaming media receiver 1 over the IP network. The functions of the content server may optionally be provided by several co-operating servers.

The media streaming receiver 1 is connected to a television 5. This allows not only the content from the content server 4 to be viewed using the streaming media receiver 1, but it also allows the streaming media receiver 1 to use the television 5 as a display for its user interface. Sound from the media streaming receiver 1 can be output to the television 5 or to an optional amplifier (not shown).

Native software 13 of the streaming media receiver comprises an IGMP module 14 for interfacing with the content server 4 over IP. Native software also includes software to interact with a hardware timer 18.

Hardware 15 of the streaming media receiver 1 includes a CPU 16, an IR receiver 17, a timer 18, a hard drive or other magnetic, optical and/or solid state persistent storage 19 and internal memory 20, such as RAM (random access memory). The timer 18 can be a separate hardware unit or implemented using other suitable low power consuming elements.

When the streaming media receiver 1 is in a passive standby mode, the browser 10, the native software 13, the hard drive 19 and the CPU 16 are all inactive. When the streaming media receiver 1 is in an active standby mode, all components shown in FIG. 1 of the streaming media receiver are active.

The streaming media receiver 1 can be a separate device, or it can be integrated in a set top box or the television 5. Alternatively, the streaming media receiver 1 can be implemented using a general purpose computer, such as a personal computer, or a more media related device such as a media player or even a game console.

Figure 2A:
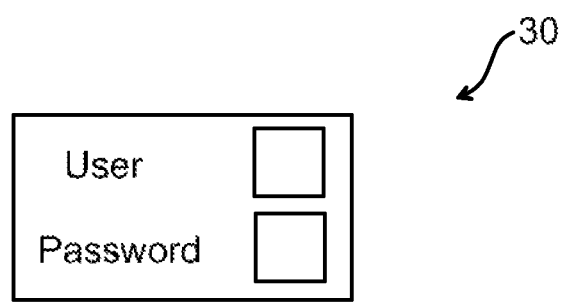
FIG. 2a is a schematic screen view of a login screen effected by the streaming media receiver of FIG. 1.

FIG. 2a is a schematic screen view of a login screen 30 effected by the streaming media receiver of FIG. 1. The login screen shows a simple user authentication where user name and password can be entered by a user of the streaming media receiver.

Figure 2B:
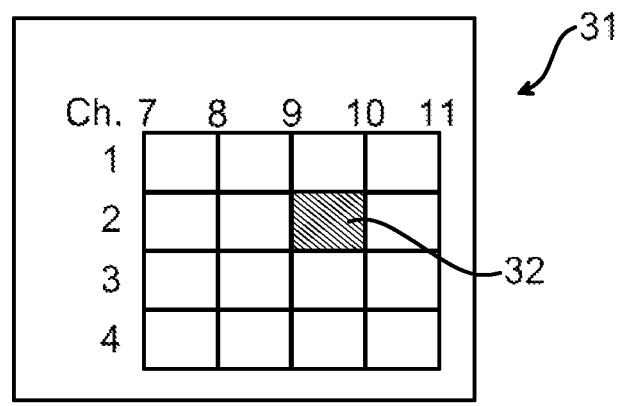
FIG. 2b is a schematic screen view of a recording scheduling screen effected by the streaming media receiver of FIG. 1.

FIG. 2b is a schematic screen view 31 of a recording scheduling screen provided by the streaming media receiver of FIG. 1. The screen view 31 can be viewed on the television 5 of FIG. 1. The screen view 31 shows a schematic electronic programming guide (EPG) in a matrix type layout where channels are shown vertically and time is shown horizontally. A shaded rectangle 32 indicates that channel 2 is to be recorded between 9 and 10, which can be effected using the wakeup scheme discussed with reference to FIG. 3a.

Figure 3A:
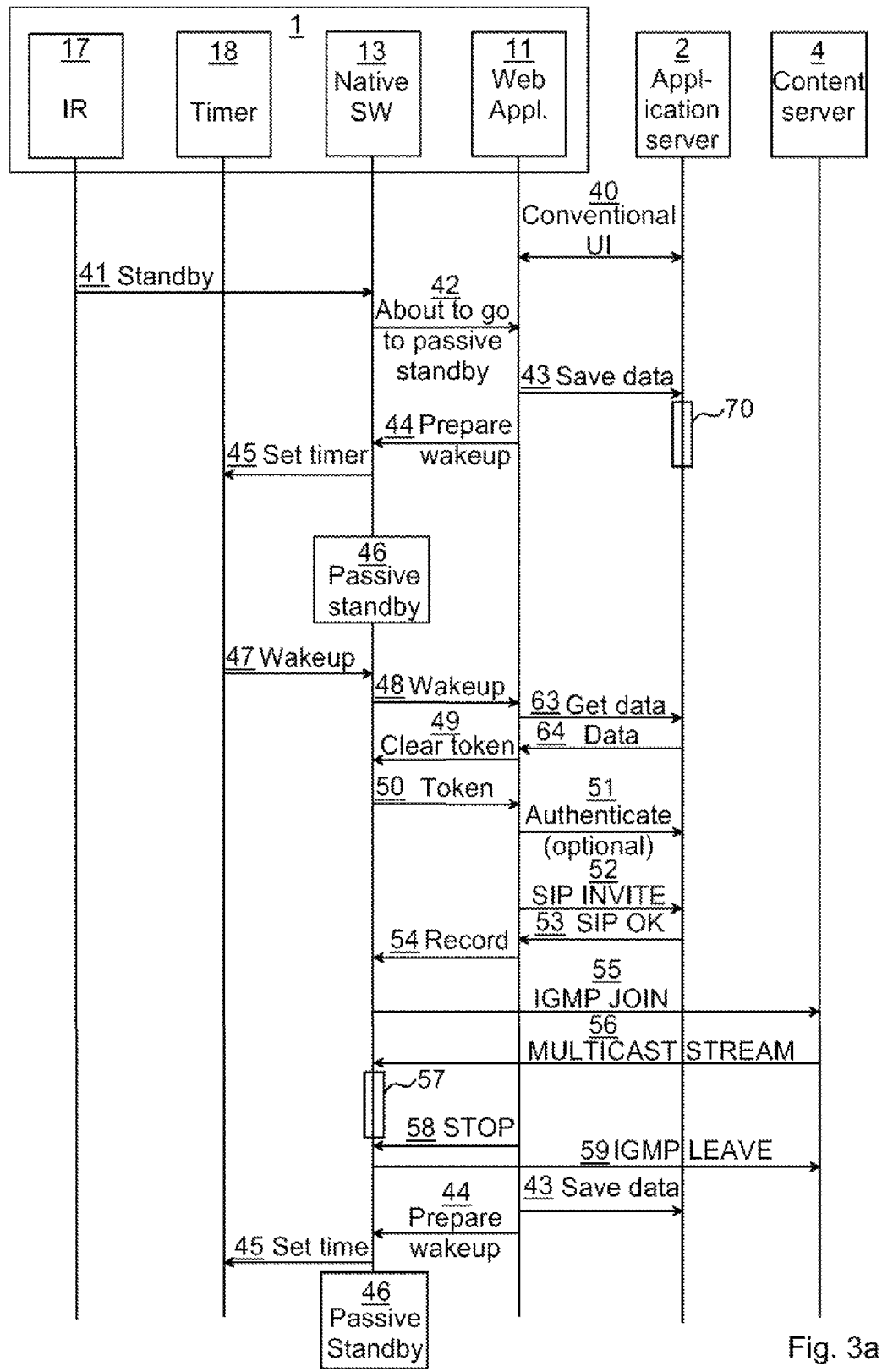
FIG. 3a is a sequence diagram illustrating an embodiment of the present invention used for scheduled recordings.

FIG. 3a is a sequence diagram illustrating an embodiment of the present invention used for scheduled recordings. When the sequence starts, there is a conventional user interface (UI) 40 active using the web application 11 and the application server 2. Through the conventional UI, the user can e.g. control what channel to tune to, view the EPG, schedule recordings, etc. Optionally, user authentication credentials such as those illustrated in FIG. 2a of the conventional user interface 40 is stored the web browser 10 or native software 13.

First a user of the streaming media receiver 1 indicates that the streaming media receiver is to be put into a standby mode, e.g. by pressing a standby key on a remote control (not shown) for the streaming media receiver 1. This signal is received by the IR receiver 17 and the IR receiver sends a signal 41 to the native software 13 indicating that the streaming media receiver 1 is about to go to a passive standby mode. The native software 13 then notifies 42 any active web applications 11 that the streaming media receiver 1 is about to go into a passive standby mode. For clarity reasons, the processing of only one web application is disclosed below. If there are more than one web application, each one of these performs its own processing in accordance with what is disclosed herein.

The active web application 11 responds by acting quickly to this information. The active web application 11 can optionally send a message to the application server with data 43 to be saved. For example, the current state, such as navigation state of the user or any current data or configuration data of the web application can be saved this way. The application server 2 receives the message and saves 70 the data appropriately. However, since there may be a latency of sending the data 43 and effecting the data storing by the application server 2, the streaming media receiver 1 may already be in a passive standby mode by the time the storing 70 is finished. Consequently, the streaming media receiver 1 does not need to wait for a confirmation response from the application server 2 in order to save time.

The active web application 11 also sends a message 44 to the native software 13 to prepare a wakeup. This message 44 includes a time at when the web application 11 is to be reinstated and optionally a URI (uniform resource indicator) by which the web application 11 is to be reinstated. Optionally, the URI has to conform with a pattern corresponding to the calling web application 11, such as the URI having the same domain as the calling web application 11. This increases security by preventing malicious code from scheduling code to be executed from undesired sources. Optionally, the message 44 comprises a token being a data container comprising any additional data the web application 11 would like to be available when the web application is reinstated.

The native software 13 then sends a set timer message 45 to the timer 18 to set the timer to send a signal at the time determined from the prepare wakeup message 44 from the web application 11.

The streaming media server then goes into a passive standby mode 46. This can be triggered at a certain time from receiving the standby message 41, e.g. 500 milliseconds. Other suitable times can be selected freely, keeping in mind to balance processing time requirements against providing the user with a fast response. Alternatively or additionally, the passive standby 4b is triggered after the set timer message 45 was sent. When these two alternatives are combined, the first trigger to the passive standby mode can effect the passive standby mode.

At the time indicated by the set timer message 45, the timer 18 sends a wakeup signal 47 to the native software. The native software 13 sets the streaming media receiver 1 in an active standby state and sends a wakeup message 48 to the web application 11, e.g. by using the URI supplied in the prepare wakeup message 44. After the web application 11 is again running, it sends a message 63 to the application server 2 to get the data stored prior to entering passive standby 46. As a response, the application server 2 sends the requested data 64.

Optionally, the web application requests the token by sending a clear token message 49 to the native software 13, which responds by sending the token 50 to the web application 11 and removing the token from the native software 13. Optionally, the token is retained in the native software with a flag indicating that, and optionally when, the token was sent to the web application 11. In one embodiment, the token is included in the wakeup message 48 to make the process more efficient.

Optionally, the web application is authenticated 51 using the web browser, e.g. using the stored credentials, with the application server 2. In other words, the web application does not authenticate itself; rather, the web application is authenticated by the web browser or the native software. This is valuable since, due to there not being any UI available in the active standby state, whereby the web application can not receive credentials from the user.

The steps disclosed above are common for all applications. Now it will be described a scenario where further processing is used for when a scheduled recording is to start. The web application then sends a SIP (session initiation protocol) INVITE message 52 to the application server, where the response is a SIP OK message 53 if everything is ok. Since the web application is active and SIP is used, a policy server (not shown) can be used to verify that this specific media streaming receiver 1 is allowed to receive the media and that there is sufficient bandwidth for this to happen.

The web application 11 then sends a record message 54 to the native software 13. The native software 13, and more specifically, the IGMP module 14, then sends an IGMP JOIN message 55 to the content server 4. The content server 4 responds by sending the actual content to the native software 13 in a multicast stream 56. The native software 13 records 57 the media of the stream until a stop message 58 is sent from the web application 11 to the native software. Optionally, the prior record message 54 includes a stop time, in which case the stop message 58 does not need to be sent.

When the recording is to be stopped, the native software 13 sends an IGMP LEAVE message 59 to stop the media stream. Optionally, new messages to save data 43, prepare wakeup 44 and set timer 45 are sent again, e.g. to schedule a new recording after the recording that just ended.

Once the timer is set, the native software 13 can set the streaming media receiver in a passive standby 46 again.

In this way, the streaming media receiver 1 can wake up from passive standby to active standby and execute a scheduled web application 11 during active standby. This allows significantly more flexibility compared to what is possible in the prior art.

Figure 3B:
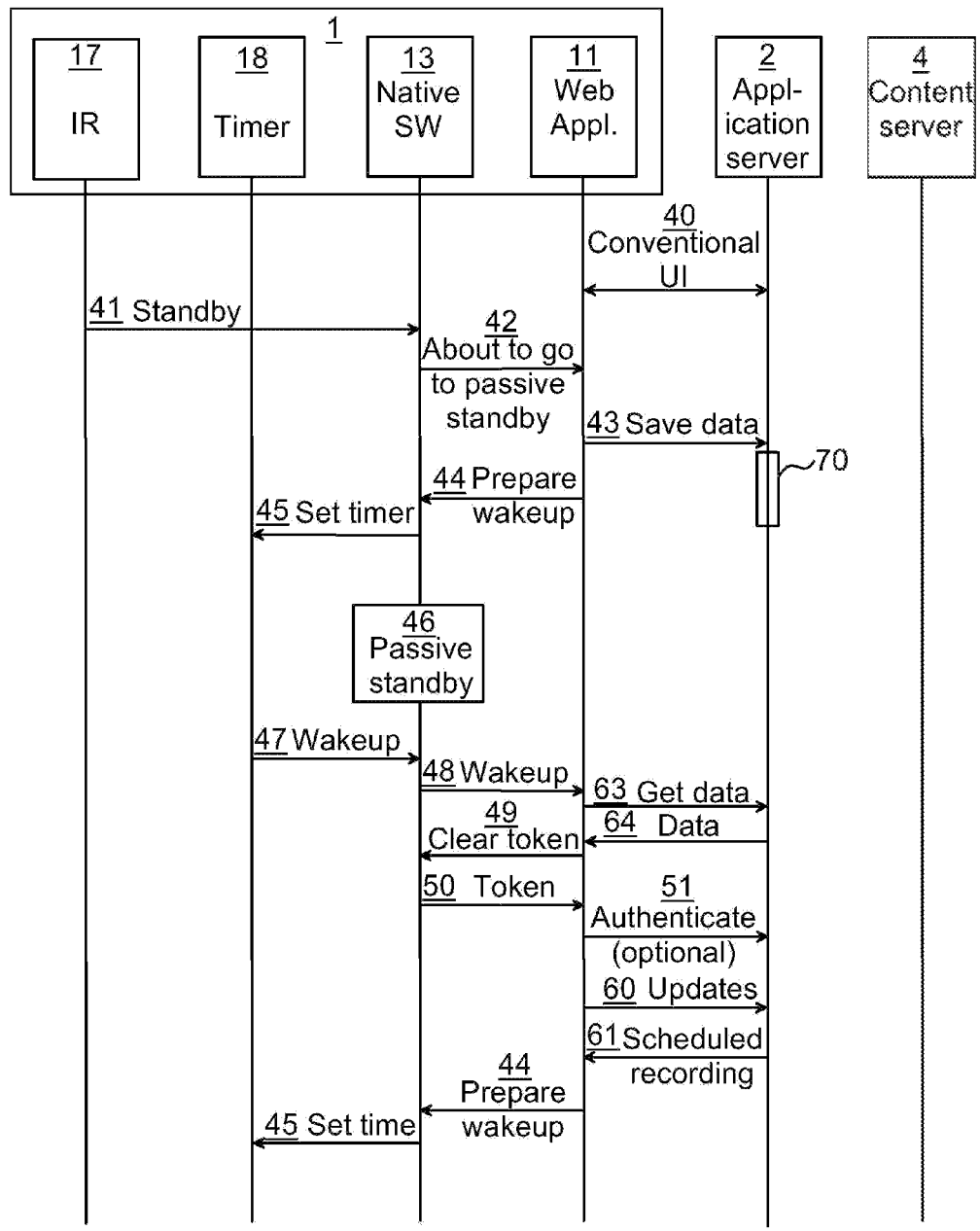
FIG. 3b is a sequence diagram illustrating an embodiment of the present invention used for server pushed recording.

FIG. 3b is a sequence diagram illustrating an embodiment of the present invention used for server pushed recording.

Messages and signals 40 to 51 and 63, 64 correspond to those described in FIG. 1. In this example, the wakeup is scheduled to occur at a time based on a regular interval, e.g. on the next whole hour. Other intervals are equally possible within the scope of the present invention.

After the optional authentication 51, the web application 11 sends a message 60 to the application server asking for any updates to scheduled recordings. The application server 2 can then respond by sending the next scheduled recording 61. This allows a user to, for example, interact with the application server 2 using any web browser while out of the home to schedule recordings. In other words, the user could use a web browser of a mobile phone or any internet connected computer to interact with the application server 2 to schedule a recording for the streaming media receiver in the home of the user. In the regular polling according to this example, such recordings will be effected using the streaming media receiver 1 of the user.

When the scheduled recording 61 has been received, the web application 11 uses the prepare wakeup message 44 and the resulting set timer message 45 to schedule a recording to occur according to the received scheduled recording message 61.

If the scheduled recording message is empty, the web application schedules a new wakeup to occur at a time based on the regular interval, e.g. on the next whole hour.

Another example where embodiments of the present invention can be applied is a subscription download service. In one example, the user subscribes to content to be downloaded daily, e.g. a movie of the day service. In order to not congest networks, this download could be scheduled to occur at night, e.g. at 2 a.m. every night. Such conditions can be part of the terms the user has to accept when signing up for the service. Consequently, with embodiments of the invention, such a download, using a web application is fully supported, where network congestion impact is minimal.

Another example where embodiments of the present invention can be applied is when there are time changes in an electronic programming schedule. A web application 11 for recording can, upon being woken up, check with the application server 2 if there are any delays to the scheduled recording, in which case, the web application 11 reschedules the recording to the new estimated start time. Optionally, cancelled programs are not recorded at all, which prevents wasted storage space on the hard drive.

Figure 4:
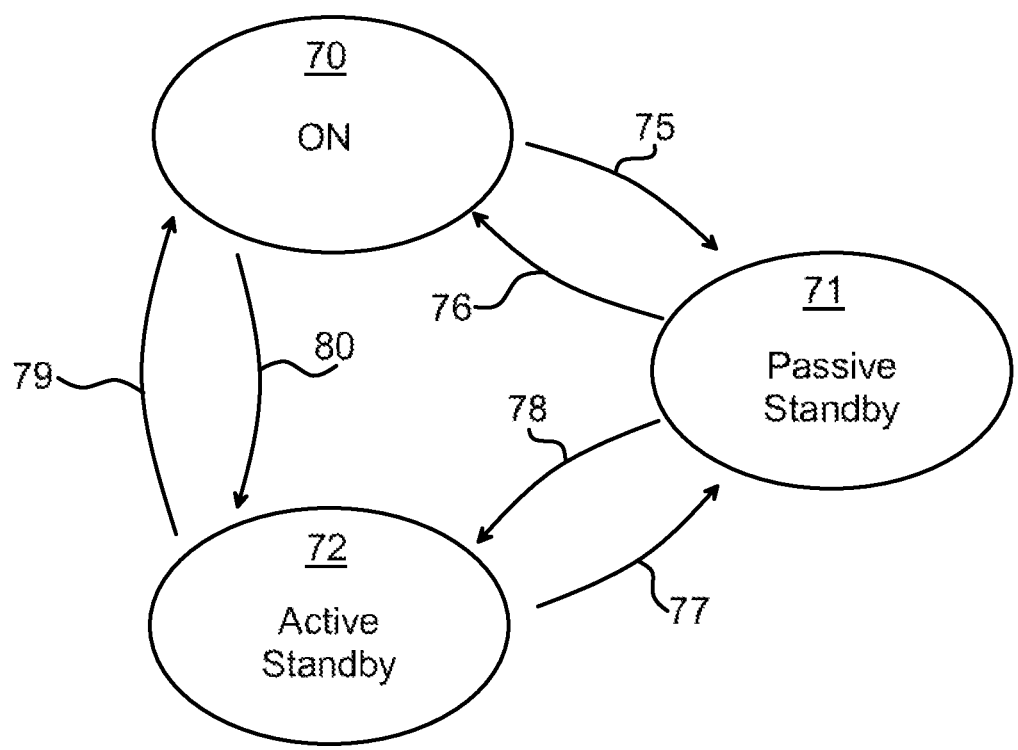
FIG. 4 is a state diagram illustrating standby modes in the streaming media receiver of FIG. 1.

FIG. 4 is a state diagram illustrating standby modes in the streaming media receiver 1 of FIG. 1. There are three states corresponding to what is described before, an on state 70, a passive standby state 71 and an active standby 72. The on state 70 is a state where the streaming media receiver 1 is fully functional with a full UI. The passive standby state 71 is a state where only the bare minimum of components are active, e.g. in order to not consume more than 1 watt. The active standby state 72 is a state where all components except user interface components are active.

The streaming media receiver 1 transitions 75 from on 70 to passive standby 71 when the user presses the standby button on the remote (or on the streaming media receiver 1 itself), as explained above. Analogously, the streaming media receiver 1 transitions 76 from passive standby 71 to on 70 when the user presses a power on button on the remote (or on the streaming media receiver 1 itself).

The streaming media receiver 1 transitions 78 from passive standby 71 to active standby 72 e.g. when the timer expires. Once the active standby processing has ended, e.g. at the end of a recording or download, the streaming media receiver 1 transitions back to the passive standby 71.

Similarly to the interactions between passive standby 71 and on 70, the streaming media receiver 1 can transition 79, 80 between on 70 and active standby 72 using standby/power on buttons.

It is to be noted that while in the on state 70, a scheduled recording, download or other scheduled processing could start, whereby a press on the standby button would result in a transition 80 from on 70 to active standby 72, regardless of the previous state of the streaming media receiver 1. Analogously, a previously running scheduled recording or other scheduled processing could end while the streaming media receiver 1 is in on state 70. In this case, a press on the standby button would result in a transition 75 from on 70 to passive standby 72, regardless of the previous state of the streaming media receiver 1.

Another state (not shown) is an off state. In such a state, there is no power supplied to the media streaming receiver 1, whereby no wakeup functions or IR commands can be active. The off state is entered if the power is completely disconnected from the streaming media receiver, such as pulling the plug or during a power outage. In order to allow appropriate processing of web applications, any web application can optionally register to be started when the media streaming receiver 1 is again powered. Such a registration can include a URI and optional token, in a similar way to the prepare wakeup message 44 of FIGS. 3*a-b*. During power up, the native software 13 would thus launch any registered web applications.

Figure 5:
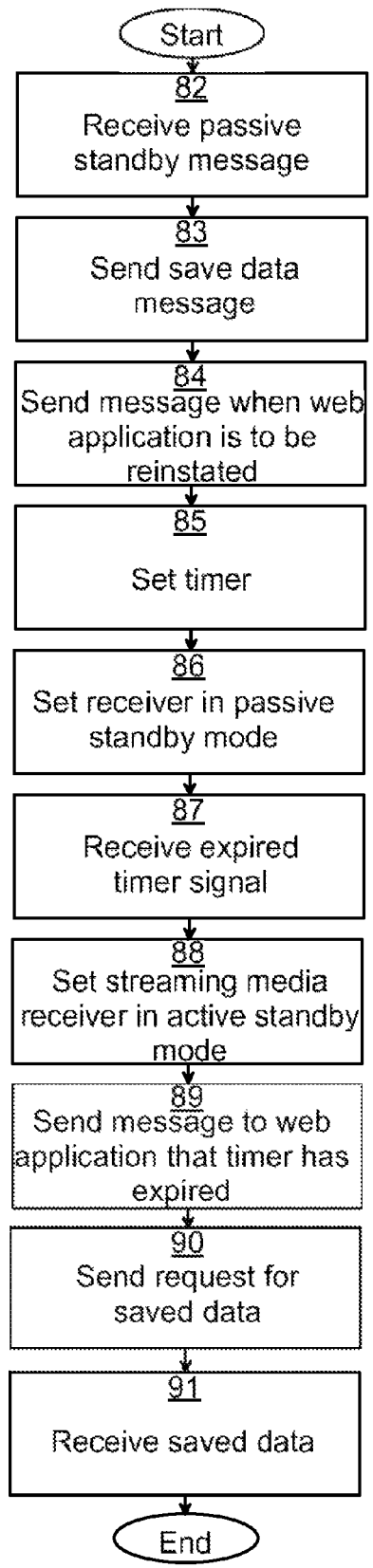
FIG. 5 is a flow chart illustrating a method which can be executed in the streaming media receiver of FIG. 1.

FIG. 5 is a flow chart illustrating a method which can be executed in the streaming media receiver of FIG. 1. The flow chart is equivalent to the steps taken by the streaming media receiver in FIGS. 3*a* and 3*b*.

In a receive passive standby message 82, a message is received by an active web application 11 from the native software indicating that the streaming media receiver 1 is to go into passive standby. This can be a response to e.g. a command from a user control device using e.g. IR, RF (radio frequency), or an IP network, indicating that the streaming media receiver 1 is to go into passive standby.

The active web application then, in a send save data message step 83, sends a message to the application server 2 to save data in a location separate from the streaming media receiver 1. This allows the saved data to be used, e.g. by the same user/subscriber, but from a different streaming media receiver 1, for instance in the same home.

In a send message when web application is to be reinstated step 84, the web application sends a message to the native software to indicate the time when the web application is to be reinstated.

In a set timer step 85, the native software sets the timer to expire at the time indicated in the previous step. The time can be set as a timestamp at when the timer expires or a duration after which the timer expires. In any case, the expiration time corresponds to the time in the previous step.

In a set receiver in passive standby mode 86, the receiver is set to be in the passive standby mode.

In a receive expired timer signal step 87, a signal is received from the timer that the timer has expired. In other words, the time that was set has been reached.

In a set streaming media receiver in active standby mode step 88, the receiver is set to be in active standby mode. Since there has been no user action, the streaming media receiver 1 is not set to be in a fully on mode, but rather the active standby mode.

In a send message to web application that timer has expired step 89, a message is sent from the native software to the web application that the timer has expired.

In a send request for saved data step 90, the web application sends a request to the application server to retrieve the data saved in the send save data message step 83.

The previously saved data in the application server is subsequently received in a receive saved data step 91.

Figure 6:
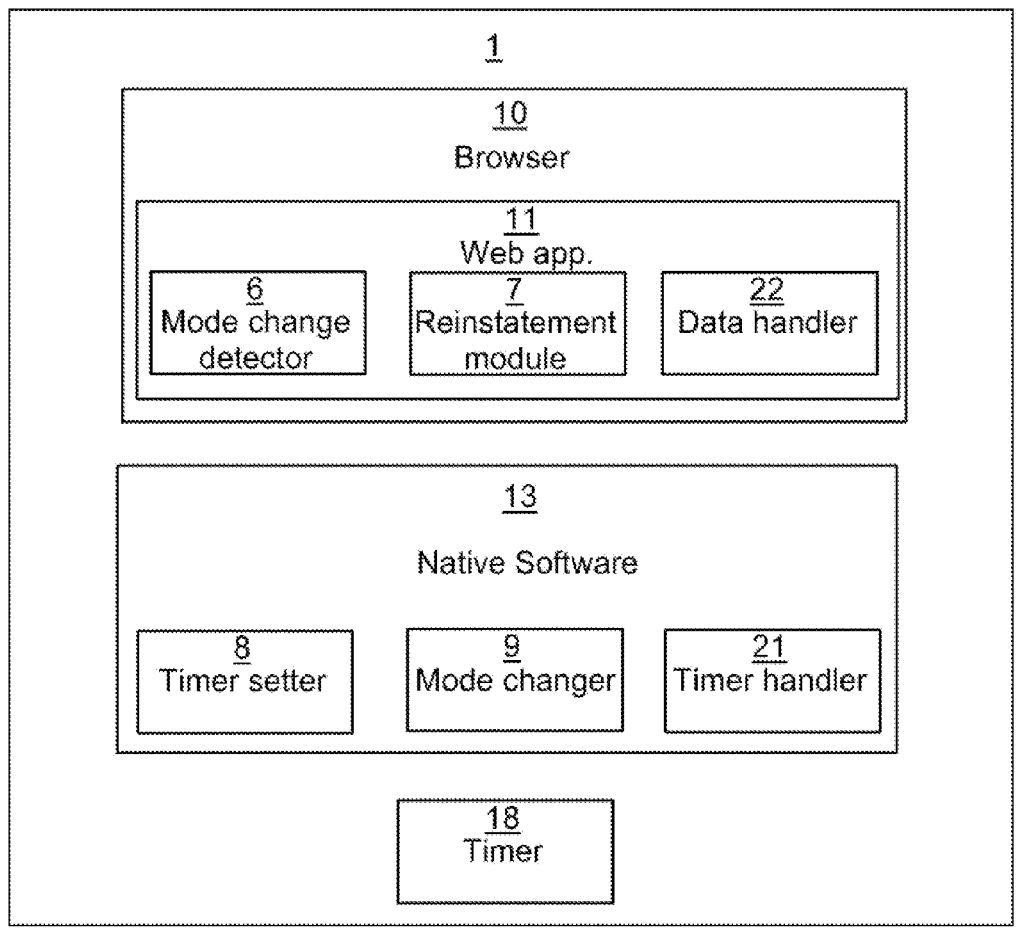
FIG. 6 is a schematic diagram of the streaming media receiver of FIG. 1 showing an alternative modular view of the streaming media receiver.

FIG. 6 is a schematic diagram of the streaming media receiver of FIG. 1 showing an alternative modular view of the streaming media receiver. In particular, some modules of the web application 11 and the native software 13 are shown. The modules can be implemented using software such as a computer program executing in the streaming media receiver 1.

All modules depend on an execution environment (see FIG. 1) which utilises the controller 16, memory 20 and an I/O interface. It is to be noted that, in practice, modules can be combined if so desired.

The web application 11 comprises a mode change detector 6, a reinstatement module 7 and a data handler 22. The mode change detector 6 is arranged to receive a message indicating that the streaming media receiver 1 is to be put in a passive standby mode 71. The reinstatement module 7 is arranged to send a message to the native software indicating when the active web application is to be reinstated. The data handler 22 is arranged to send a message comprising data to be saved to an application server prior to entering the passive standby mode and to receive a message comprising the data that was saved from the application server after leaving the passive standby mode.

The native software comprises a timer setter 8, a mode changer 9 and a timer handler 21. The timer setter 8 is arranged to set the timer with the time of when the web application is to be reinstated. The mode changer 9 is arranged to set the streaming media receiver 1 in a passive standby mode 71 after the timer has been set or an active standby mode after the timer has expired. The timer handler 21 is arranged to receive a signal that the timer has expired and send a message to the web application that the timer has expired.

Figure 7:
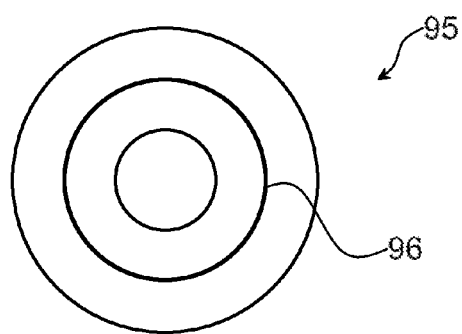
FIG. 7 shows one example of a computer program product comprising computer readable means.

FIG. 7 shows one example of a computer program product 95 comprising computer readable means. On this computer readable means a computer program 96 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 20 of the streaming media receiver 1. While the computer program 101 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method executed in a streaming media receiver, the streaming media receiver comprising native software and web software for executing a web application, the method comprising the steps of:
   receiving, in an active web application running in the web software, a message indicating that the streaming media receiver is to be put in a passive standby mode;
   sending, from the active web application, a message comprising data to be saved to an application server, wherein the data defines an operational state of the active web application;
   sending, from the active web application, a message to the native software indicating when the active web application is to be reinstated;
   setting, from the native software, a timer to the time of when the web application is to be reinstated;
   setting the streaming media receiver in a passive standby mode by suspending running of the active web application;
   receiving, in the native software, a signal that the timer has expired;
   setting the streaming media receiver in an active standby mode by reinstating running of the active web application;
   sending, from the native software, a message to the web application that the timer has expired;
   receiving, in the active web application, a message comprising the data that was saved, from the application server; and
   setting an operational state of the active web application using the data to be based on the operational state of the active web application before the streaming media receiver was set to the passive standby mode.

2. The method according to claim 1, further comprising the step, prior to the step of receiving a message comprising the data that was saved, of: sending a request, from the web application server, to the application server to send the data that was saved.

3. The method according to claim 1, wherein the step of sending a message to the native software comprises setting a uniform resource indicator, URI, to be followed upon setting the streaming media receiver in an active standby mode.

4. The method according to claim 1, wherein the step of sending a message to the native software comprises setting a token with any supplementary information from the active web application.

5. The method according to claim 1, wherein the method is executed in a streaming media receiver in compliance with internet protocol television, IPTV.

6. A computer program product for operating a streaming media receiver comprising native software and web software for executing a web application, the computer program product comprising a computer readable storage device having computer readable program code which, when run on the streaming media receiver, causes the streaming media receiver to:
   receive, in an active web application running in the web software, a message indicating that the streaming media receiver is to be put in a passive standby mode;
   send, from the active web application, a message comprising data to be saved to an application server, wherein the data defines an operational state of the active web application;
   send, from the active web application, a message to the native software indicating when the active web application is to be reinstated;
   set, from the native software, a timer with the time of when the web application is to be reinstated;
   set the streaming media receiver in a passive standby mode by suspending running of the active web application;
   receive, in the native software, a signal that the timer has expired;
   set the streaming media receiver in an active standby mode by reinstating running of the active web application;
   send, from the native software, a message to the web application that the timer has expired;
   receive, in the active web application, a message comprising the data that was saved, from the application server, and
   setting an operational state of the active web application using the data to be based on the operational state of the active web application before the streaming media receiver was set to the passive standby mode.

7. A streaming media receiver comprising:
   a processor; and
   a memory coupled to the processor and comprising native software and web software, for executing a web application, that when executed by the processor causes the processor to perform operations comprising:

receiving, in an active web application running in the web software, a message indicating that the streaming media receiver is to be put in a passive standby mode;

sending, from the active web application, a message comprising data to be saved to an application server, wherein the data defines an operational state of the active web application;

sending, from the active web application, a message to the native software indicating when the active web application is to be reinstated;

setting, from the native software, a timer to the time of when the web application is to be reinstated;

setting the streaming media receiver in a passive standby mode by suspending running of the active web application;

receiving, in the native software, a signal that the timer has expired;

setting the streaming media receiver in an active standby mode by reinstating running of the active web application;

sending, from the native software, a message to the web application that the timer has expired;

receiving, in the active web application, a message comprising the data that was saved, from the application server, and setting an operational state of the active web application using the data to be based on the operational state of the active web application before the streaming media receiver was set to the passive standby mode.

8. The streaming media receiver according to claim 7, wherein the streaming media receiver operates in compliance with internet protocol television, IPTV.

9. The computer program product of claim 6, wherein the computer readable program code executed by the streaming media receiver is in compliance with internet protocol television, IPTV.

10. The computer program product of claim 6, wherein the computer readable program code is further configured to send a request from the active web application to the application server to send the data that was saved.

11. The streaming media receiver according to claim 7, wherein the sending, from the native software, the message to the web application that the timer has expired, comprises sending a request to the application server to send the data that was saved, after leaving the passive standby mode.

* * * * *